(12) United States Patent
Negoro (10) Patent No.: US 9,897,747 B2
(45) Date of Patent: Feb. 20, 2018

(54) DISPLAY APPARATUS

(71) Applicant: Sakai Display Products Corporation, Sakai-shi, Osaka (JP)

(72) Inventor: Kazuhiko Negoro, Sakai (JP)

(73) Assignee: SAKAI DISPLAY PRODUCTS CORPORATION, Osaka (JP)

( * ) Notice: Subject to any disclaimer, the term of this patent is extended or adjusted under 35 U.S.C. 154(b) by 184 days.

(21) Appl. No.: 14/425,226

(22) PCT Filed: Mar. 7, 2014

(86) PCT No.: PCT/JP2014/055891
§ 371 (c)(1),
(2) Date: Mar. 2, 2015

(87) PCT Pub. No.: WO2015/132943
PCT Pub. Date: Sep. 11, 2015

(65) Prior Publication Data
US 2016/0259122 A1    Sep. 8, 2016

(51) Int. Cl.
*G02F 1/1333*    (2006.01)
*G02F 1/1341*    (2006.01)
(Continued)

(52) U.S. Cl.
CPC ........... *G02B 6/0088* (2013.01); *G02B 6/005* (2013.01); *G02B 6/0011* (2013.01);
(Continued)

(58) Field of Classification Search
CPC .... G02B 6/005; G02B 6/0011; G02B 6/0088; G02F 2001/133317; G02F 1/133308; G02F 2001/133314; G02F 1/1341
See application file for complete search history.

(56) References Cited

U.S. PATENT DOCUMENTS

2001/0030730 A1* 10/2001 Iwanaga ............... G02F 1/1339
349/153
2002/0075245 A1* 6/2002 Kawashima ...... G02F 1/133615
345/173
(Continued)

FOREIGN PATENT DOCUMENTS

JP    10-096908    4/1998
JP    2003-131221 A    5/2003
(Continued)

*Primary Examiner* — Michael Caley
*Assistant Examiner* — Jia Pan
(74) *Attorney, Agent, or Firm* — Rudy J. Ng; Bret E. Field; Bozicevic, Field & Francis LLP (57) ABSTRACT

Provided is a display apparatus having a structure capable of realizing reduction in thickness and border width. The display apparatus has a liquid-crystal panel prepared by enclosing a liquid-crystal material between a pair of glass substrates opposing to each other, a transparent plate opposed to the liquid-crystal panel, and an optical sheet arranged between the liquid-crystal panel and the transparent plate, and has a face smaller than the liquid-crystal panel, where the transparent plate is a glass plate having a wide surface of substantially a same shape as a wide surface of each of the glass substrates, and the display apparatus also includes a frame body arranged between the liquid-crystal panel and the transparent plate, the frame body surrounding an outer periphery of the optical sheet, and the frame body being thicker than the optical sheet.

10 Claims, 8 Drawing Sheets

(51) Int. Cl.
  *F21V 8/00* (2006.01)
  *G02F 1/133* (2006.01)
(52) U.S. Cl.
  CPC ......... *G02B 6/0065* (2013.01); *G02F 1/1341* (2013.01); *G02F 1/13306* (2013.01); *G02F 1/133308* (2013.01); *G02F 2001/133302* (2013.01); *G02F 2001/133314* (2013.01); *G02F 2001/133317* (2013.01)

(56) References Cited

U.S. PATENT DOCUMENTS

| | | | |
|---|---|---|---|
| 2007/0222910 A1* | 9/2007 | Hu | G02B 6/0088 349/58 |
| 2009/0015747 A1 | 1/2009 | Nishizawa et al. | |
| 2009/0185100 A1 | 7/2009 | Matsuhira et al. | |
| 2010/0238648 A1* | 9/2010 | Tsukahara | G02B 6/005 362/97.1 |
| 2011/0285934 A1* | 11/2011 | Watanabe | G02F 1/133526 349/58 |
| 2012/0140521 A1* | 6/2012 | Kao | G02F 1/133308 362/623 |
| 2013/0027857 A1* | 1/2013 | Jeong | G02F 1/133308 361/679.01 |
| 2014/0204281 A1* | 7/2014 | Maeda | G02F 1/133611 348/794 |
| 2014/0204310 A1* | 7/2014 | Lee | G02F 1/133308 349/62 |
| 2015/0168769 A1* | 6/2015 | Lee | G02F 1/133308 349/58 |

FOREIGN PATENT DOCUMENTS

| | | | |
|---|---|---|---|
| JP | 2007-232809 A | | 9/2007 |
| JP | 2007232809 A | * | 9/2007 |
| JP | 2009-020168 A | | 1/2009 |
| JP | 2009-140829 A | | 6/2009 |
| JP | 4575486 | | 11/2010 |
| JP | 2012-118498 A | | 6/2012 |

\* cited by examiner

DISPLAY APPARATUS

This application is the national phase under 35 U.S.C. § 371 of PCT International Application No. PCT/JP2014/055891 which has an International filing date of Mar. 7, 2014 and designated the United States of America.

BACKGROUND OF THE INVENTION

1. Field of the Invention

The present invention relates to a display apparatus using a liquid-crystal panel, and more particularly to a display apparatus having a configuration capable of further realizing reduction in thickness and border width of the apparatus.

2. Description of Related Art

A display apparatus using a liquid-crystal panel includes a light source, and also includes an optical sheet for diffusing or condensing light from the light source between the light source and the liquid-crystal panel. For a light source in a recent display apparatus, in order to reduce the thickness of the display apparatus and to suppress unevenness in luminance, an edge light type is frequently used in which multiple light emitting diodes are so arranged to be opposed to an end surface of a transparent plate referred to as a light guide plate, and light entering from the end surface is uniformly emitted from a wide surface.

While a light guide plate made of the same glass material as that for the liquid-crystal panel may sometimes be used, a light guide plate is often made of resin such as PMMA (Poly (methyl methacrylate)) or MS, which has a relatively low rigidity compared to glass. Moreover, the optical sheet is a flexible film such as PET (Polyethylene terephthalate). It is thus necessary, for positioning a light guide plate and an optical sheet with a liquid-crystal panel, to prepare a holding member made of resin or metal, which is more rigid than the materials used for those to be positioned.

Furthermore, the light guide plate and optical sheet have relatively high coefficients of thermal expansion, which causes wrinkles or deflections particularly because the optical sheet is a film. The wrinkles or deflections in the optical sheet cause defects such as unevenness or lowering in luminance of the display apparatus. The holding member for the light guide plate and optical sheet requires a holding structure for positioning and holding the optical sheet with a margin for possible expansion in consideration of thermal expansion.

A conventional display apparatus having such a holding structure is now described.

Figure 8:
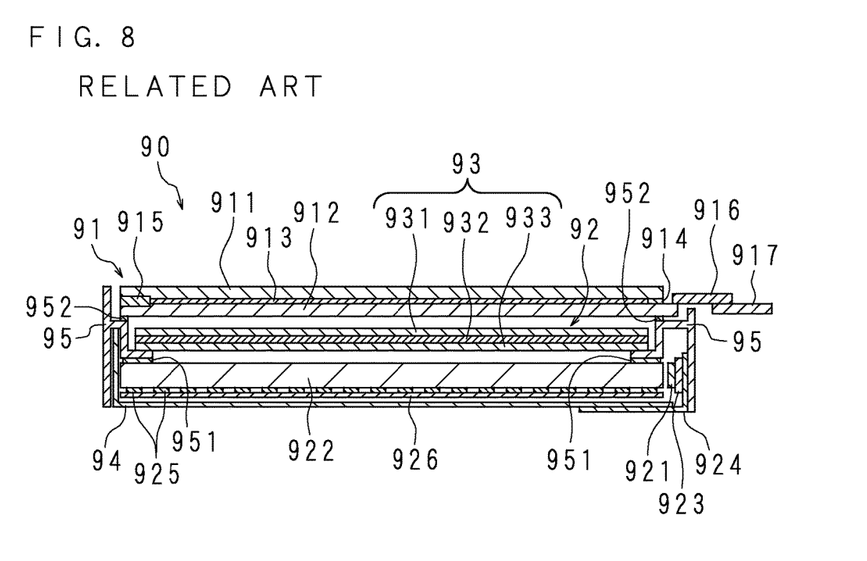
FIG. 8 is a cross section schematically illustrating the main parts of a conventional display apparatus.

FIG. 8 is a cross section schematically illustrating the main parts of a conventional display apparatus 90. The display apparatus 90 includes a liquid-crystal panel 91, a light source device 92 and an optical sheet 93, as well as holding members 94, 95 for the components described above.

The liquid-crystal panel 91 is a display panel and has the shape of a rectangular flat plate. The liquid-crystal panel 91 is so configured that liquid-crystal 913 is injected between two glass substrates 911 and 912 which are arranged to be opposed to each other with a predetermined distance therebetween, and is sealed by seal materials 914 and 915. On the glass substrates 911 and 912, various elements including an electrode for driving the liquid-crystal 913 are formed (not illustrated). The liquid-crystal panel 91 includes, at an end on one long side of the glass substrate 912, a drive circuit (driver) 916 connected to each element at an end on one long side of the glass substrate 912, and a substrate 917 supplying signals to the drive circuit 916.

The light source device 92 is a light source of the edge light type using a light emitting diode 921. The light source device 92 is so configured that multiple light emitting diodes 921 are arranged on a long and narrow substrate 923 located along an end surface on the long side of the light guide plate 922, which is made of resin with high transparency such as acrylic and is formed to have the shape of a rectangular flat plate, to be opposed to the end surface. The substrate 923 is connected to a heat sink 924 for dissipating heat generated by the light emitting diodes 921. The cross sectional shape of the heat sink 924 is an L-shape, the vertical line thereof positioned along one wide surface of the light guide plate 922 whereas the horizontal line thereof positioned along an end surface on the long side of the light guide plate 922. On one wide surface of the light guide plate 922 on the side along which a part of the heat sink 924 is located, scattering dots 925, which irregularly reflect and deflect the light traveling in the light guide plate 922 and reaching the one wide surface side and guide the light to another wide surface side, are formed by printing or laser machining.

The components of the light source device 92 are positioned by the holding member 94. The holding member 94 is, for example, made of metal, and has the shape of a rectangular box with one surface being open and a side plate on one long side thereof further being open. The bottom surface of the holding member 94 is a little larger than the dimension of the wide surface of the light guide plate 922, and the height of the side plate is a little larger than the thickness of the light guide plate 922. A reflection surface of the reflection sheet 926 is adhered to one wide surface of the light guide plate 922 where the scattering dots 925 are formed. The light guide plate 922 is placed on the holding member 94 such that the side of the reflection sheet 926 is opposed to the bottom surface of the holding member 94. The light emitting diode 921, substrate 923 and heat sink 924 are placed on one long side at which the side plate of the holding member 94 is opened. Here, the heat sink 924 is so placed as to sandwich the reflection sheet 926 and the bottom plate of the holding member 94 between the light guide plate 922 and a part of the heat sink 924 located along the wide surface of the light guide plate 922. Thus, the light source device 92 is formed, in which the light from the light emitting diode 921 enters the inside of the light guide plate 922 from the side surface of the light guide plate 922, and travels inside thereof while partially being reflected on different surfaces or totally being reflected by the reflection sheet 926, and is emitted from a wide surface of the light guide plate 922 opposite to the side of the reflection sheet 926 due to scattering by scattering dots 925. Accordingly, uniform planar light is emitted from the wide surface of the light guide plate 922 to the liquid-crystal panel 91 side.

The optical sheet 93 has a shape of a rectangle, which is an optical sheet group including three sheets of, for example, a lens sheet 931, a prism sheet 932 and a diffusion sheet 933.

The liquid-crystal panel 91 and optical sheet 93 are positioned with respect to the light source device 92 by the holding member 95 which is fitted with the holding member 94. The holding member 95 is, for example, a frame body made of resin, and is so configured that a circumferential groove is formed at the outer peripheral edge on one surface thereof and the side plates of the holding member 94 are fitted into the groove. Moreover, a receiving part for positioning the optical sheet 93 is provided at the inner peripheral edge on the other surface of the holding member 95. The receiving part has a depth a little larger than the thickness of the optical sheet 93. Furthermore, the outer peripheral edge on the other surface of the holding member 95 corresponding to the opposite side of the groove configures a protrusion circumferentially formed to correspond to the receiving part of the optical sheet 93. Parts of three side plates of the holding member 94 and the heat sink 924 are fitted into the groove of the holding member 95 as described above. It is so configured here that the inner peripheral edge on one surface of the holding member 95 presses against the circumferential part of the light guide plate 922 via a spacer 951. On the other surface of the holding member 95, the optical sheet 93 is so placed that the circumferential part of the optical sheet 93 is in contact with the receiving part. Next, the liquid-crystal panel 91 is placed on the holding member 95 via the spacer 952 such that the outer peripheral edge of the glass substrate 912 of the liquid-crystal panel 91 corresponds to the projection on the above-described other surface of the holding member 95. Here, the liquid-crystal panel 91 is so placed that the side of the drive circuit 916 and the substrate 917 corresponds to the side of the light emitting diode 921 of the light source device 92. Accordingly, the liquid-crystal panel 91 and optical sheet 93 are positioned with respect to the light source device 92, which forms the display apparatus 90.

As described above, in the conventional display apparatus 90, thinning of the apparatus is insufficient because of the thickness of the holding members 94 and 95, and the narrowing of border width is also insufficient because the holding members 94 and 95 are larger in plane direction than the liquid-crystal panel 91 and light guide plate 922. To address this, a configuration for realizing reduction in thickness of an apparatus having a small display panel, such as a mobile phone, is disclosed.

SUMMARY OF THE INVENTION

A display apparatus as the above proposed is configured to have a transparent protection plate and light guide plate, provided on the display surface side of a liquid-crystal panel, larger than the liquid-crystal panel, and an excess part with respect to the liquid-crystal panel is securely bonded with an adhesive. The display apparatus as the above proposed does not require a holding member and thus reduction in thickness is possible. It is, however, insufficient in narrowing of border width since the protection plate and light guide plate are made larger than the liquid-crystal panel.

Moreover, in the case where the protection plate is made of reinforced glass and the light guide plate is made of acrylic resin such as PMMA, a difference may occur in the size of the plates due to heat from the light source, since glass and acrylic resin have different expansion coefficients. This will not be a problem in a small display apparatus, but may cause problems in a large display apparatus as the size difference would be larger in a large display apparatus, possibly causing separation of the protection plate from the light guide plate or causing the light guide plate to warp when the bonding strength is high, which may damage the apparatus.

The present invention has been made in view of the circumstances described above, and aims to provide a display apparatus having a structure capable of realizing reduction in thickness and border width without the need for a holding member.

A display apparatus according to the present invention, including a liquid-crystal panel prepared by enclosing a liquid-crystal material between a pair of glass substrates opposed to each other, a transparent plate opposed to the liquid-crystal panel, and an optical sheet arranged between the liquid-crystal panel and the transparent plate and having a face smaller than the liquid-crystal panel, is characterized in that the transparent plate is a glass plate having a wide surface of substantially a same shape as a wide surface of the glass substrate, and that a frame body is arranged between the liquid-crystal panel and the transparent plate, the frame body surrounding an outer periphery of the optical sheet with a predetermined distance from the optical sheet and being thicker than the optical sheet.

The display apparatus according to the present invention is characterized in that each of the glass substrates has a substantially rectangular shape.

The display apparatus according to the present invention is characterized in that the frame body is made of a bonding material for bonding the liquid-crystal panel and the transparent plate.

The display apparatus according to the present invention is characterized in that the frame body has a shape along an entire circumference of an outer peripheral edge of the glass substrate or the transparent plate.

The display apparatus according to the present invention is characterized in that an outer periphery of the frame body is substantially equal to an outer periphery of the glass substrate or the transparent plate.

The display apparatus according to the present invention is characterized by further including a blue light emitting diode arranged to be opposed to a part of a peripheral surface of the transparent plate or to a surface of the transparent plate opposite to the liquid-crystal panel, and is characterized in that the optical sheet is composed of a plurality of optical sheets including, on a side of the transparent plate, a sheet added with a fluorescent material emitting fluorescent light on a side of a wavelength longer than a wavelength of the blue light.

The display apparatus according to the present invention is characterized by further including a blue light emitting diode arranged to be opposed to a part of a peripheral surface of the transparent plate or to a surface of the transparent plate opposite to the liquid-crystal panel, and is characterized in that a fluorescent material emitting fluorescent light on a side of a wavelength longer than a wavelength of the blue light is applied to a wide surface of the transparent plate on a side of the liquid-crystal panel.

The display apparatus according to the present invention is characterized in that gel-like or liquid-like translucent material having a refractive index lower than a refractive index of the optical sheet is filed in an inner space of the frame body.

The display apparatus according to the present invention is characterized in that the liquid-crystal panel and the transparent plate are curved plates.

According to the present invention, a transparent plate used as a light guide plate is made of glass material, and is formed in the approximately same shape as the shape of a glass substrate of a liquid-crystal panel. Therefore, the properties of the light guide plate, such as thermal expansion, thermal shrinking or stiffness, is similar to the properties of the liquid-crystal panel, so that the light guide plate and liquid-crystal panel can be integrally handled. The light guide plate and liquid-crystal panel can be positioned without discrete holding members respectively. Moreover, as glass has higher rigidity than resin such as PMMA and MS, the flatness of the light guide plate can be maintained, thereby eliminating the need for a holding member for the light guide plate. Furthermore, according to the present invention, as an optical sheet is sealed inside a frame body arranged between the liquid-crystal panel and the light guide plate, eliminating the need for a holding member for the optical sheet, the holding member being larger in the surface direction than the liquid-crystal panel or the light guide plate. Because of an appropriate distance to the optical sheet and an extra space in the thickness direction inside the frame body, the optical sheet can expand thermally inside the frame body, so that the occurrence of slack or wrinkle of the optical sheet is prevented.

According to the present invention, a liquid-crystal panel formed by a substantially rectangular glass substrate is used, and along therewith, a transparent plate used as a light guide plate, an optical sheet and a frame body also have substantially rectangular shapes. It is noted that the shape is not limited to rectangular but may also be a shape of another polygon or a shape of oval, ellipse or the like.

According to the present invention, the frame body placed between the liquid-crystal panel and the transparent plate is made of a bonding material for bonding the liquid-crystal panel and the transparent plate. Being made of glass of the same material, the liquid-crystal panel and the transparent plate can integrally be formed by bonding them together. The frame body may also serve as the bonding material and the housing of the optical sheet, eliminating the need for a conventional holding member.

According to the present invention, the outer periphery of the frame body placed between the liquid-crystal panel and the transparent plate has a shape along an entire circumference of an outer peripheral edge of a wide surface of the glass substrate or the transparent plate having substantially the same shape. This facilitates the glass substrate and the transparent plate to be integrally formed, while enabling the inner side of the frame body to be made wider.

According to the present invention, the outer periphery of the frame body plated between the liquid-crystal panel and the transparent plate is substantially equal to the outer periphery of the wide surface, having substantially the same shape, of the glass substrate and the light guide plate. This facilitates the glass substrate and transparent plate to be integrally formed, while enabling the inner side of the frame body to be made wider.

According to the present invention, in accordance with the use of the transparent plate made of glass for the light guide plate, such a configuration is adopted that a blue light emitting diode not applied with a fluorescent material is used as a light source opposed to a part of the peripheral surface of the light guide plate or to a surface of the transparent plate opposite to the liquid-crystal panel, and a sheet added with a fluorescent material emitting fluorescent light having a wavelength longer than a wavelength of blue light is included or the fluorescent material is applied to the light guide plate. Glass has non-uniform transmittance to light in the visible light region across all the different wavelengths, the transmittance to the light in the long wavelength region being particularly low. Therefore, the configuration in which a sheet added with a fluorescent material is further used or a fluorescent material is applied allows emission of light on the long wavelength side between the light guide plate and the liquid-crystal panel, making it possible to irradiate the liquid-crystal panel with uniform white light.

According to the present invention, a gel-like or liquid-like translucent material having a refractive index lower than that of the optical sheet is filled into the frame body which is placed between the liquid-crystal panel and the transparent plate and which accommodates the optical sheet therein. This can prevent expansion or deflection caused by the optical sheet absorbing moisture from the air in the display apparatus.

According to the present invention, the transparent plate used as the light guide plate is made of glass which has relatively high rigidity and is insusceptible to thermal expansion. This enables the transparent plate to be used as a basis to position other components in the display apparatus, which thus can easily realize a curved display having a transparent plate of a curved plate similar to the liquid-crystal panel.

According to the present invention, holding members for a light guide plate and an optical sheet used in conventional display apparatus is unnecessary, making display product much thinner. Moreover, a holding member having larger outer shape than a liquid-crystal panel is unnecessary, so that frame width can be narrowed.

DESCRIPTION OF THE PREFERRED EMBODIMENTS

The present invention will specifically be described below with reference to the drawings illustrating the embodiments thereof. It is to be understood that the embodiments described below are illustrative and the present invention is not limited to the following configurations.

Embodiment 1

Figure 1:
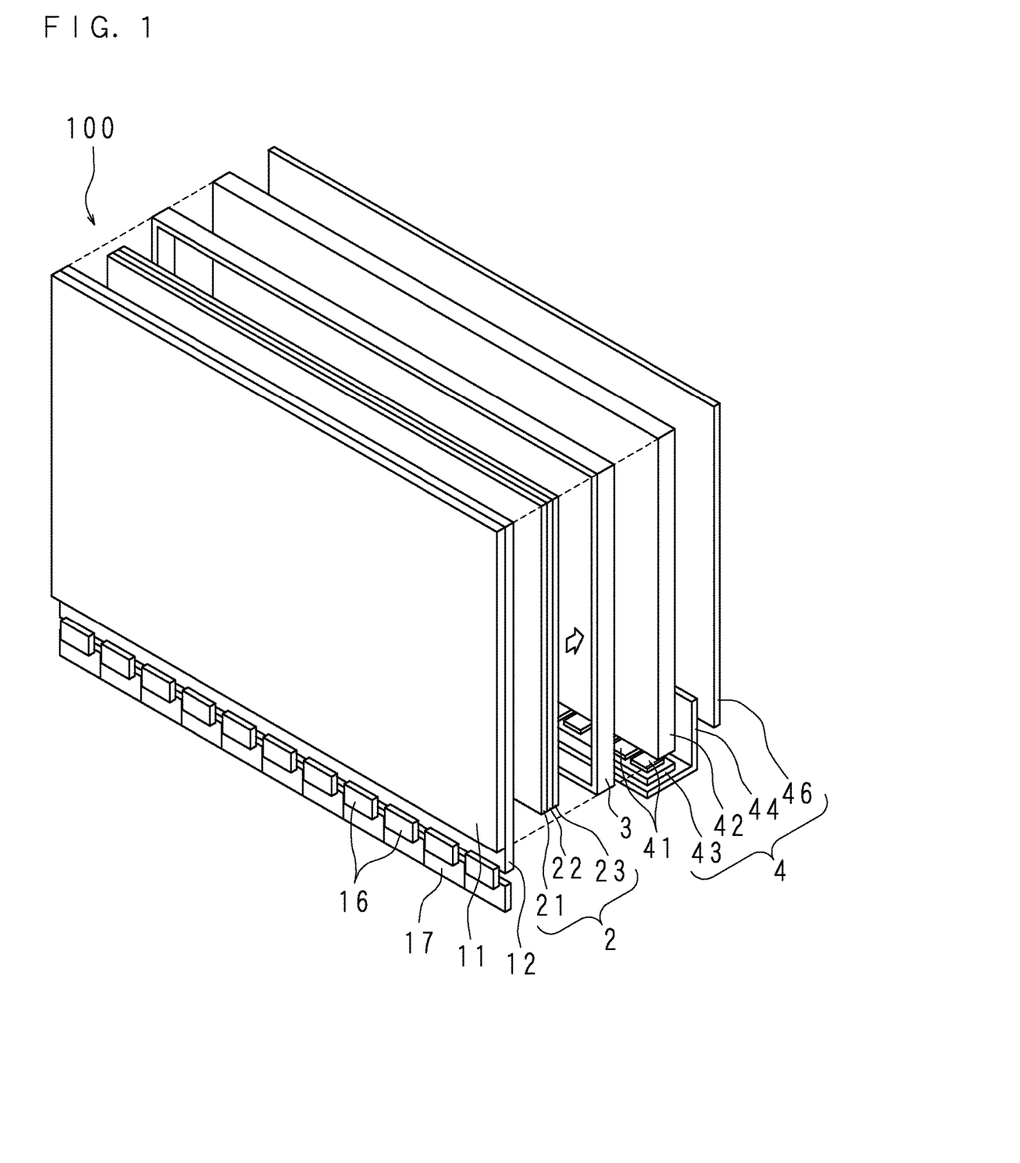
FIG. 1 is an exploded perspective view schematically illustrating the main parts of a display apparatus according to Embodiment 1.
Figure 2:
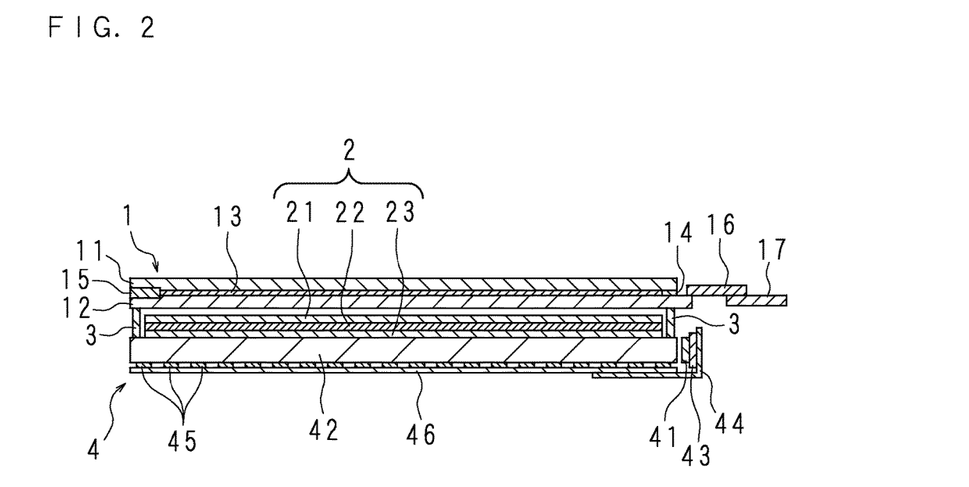
FIG. 2 is a cross section schematically illustrating the main parts of a display apparatus according to Embodiment 1.

FIG. 1 is an exploded perspective view schematically illustrating the main parts of a display apparatus 100 according to Embodiment 1, and FIG. 2 is a cross section schematically illustrating the main parts of the display apparatus 100. The display apparatus 100 includes a liquid-crystal panel 1 and a light source device 4.

The liquid-crystal panel 1 is a display panel having a shape of a rectangular flat plate. The liquid-crystal panel 1 employs an active matrix system. The liquid-crystal panel 1 is so configured that liquid crystal 13 is injected between two glass substrates 11 and 12 arranged to be opposed to each other with a predetermined distance in between, and is sealed with seal materials 14, 15. In pixel regions at the middle parts of the glass substrates 11, 12, various elements (not illustrated) are formed including an electrode for driving the liquid crystal 13. The liquid-crystal panel 1 includes, at an end on one long side of one glass substrate 12, a drive circuit (driver) 16 for supplying driving signals to various elements, and a substrate 17 connected to the drive circuit 16 for supplying signals to the drive circuit 16.

The light source device 4 is a light source of the edge light type using a light emitting diode 41. The light source device 4 is so formed that, at an end surface on a long side of the light guide plate 42 made of a rectangular flat plate glass having a wide surface of substantially the same shape as that of the glass substrate 11 of the liquid-crystal panel 1, multiple light emitting diodes 41 arranged on a long and narrow substrate 43 located along the end surface are arranged to be opposed to the end surface. It is noted that the light emitting diode 41 is a light source for emitting white light by a surface thereof which emits blue or ultraviolet light being applied with a fluorescent material. The substrate 43 on which the light emitting diode 41 is disposed is connected to the heat sink 44 for dissipating heat generated from the light emitting diodes 41. The cross sectional shape of the heat sink 44 is an L shape with a vertical line along one wide surface of the light emitting plate 42 and a horizontal line along an end surface on the one long side of the light guide plate 42. Moreover, scattering dots 45 are formed by printing or laser machining on the one wide surface of the light guide plate 42. Furthermore, a reflection sheet 46 is adhered to the one wide surface of the light guide plate 42. In the light source device 4 configured as described above, the light from the light emitting diode 41 enters the light guide plate 42 from the end surface on the long side thereof, travels inside the light guide plate 42 due to partial reflection by different surfaces or total reflection by the reflection sheet 46, and is emitted from the wide surface on the opposite side of the reflection sheet 46 due to scattering by the scattering dots 45. This allows the wide surface of the light guide plate 42 to emit uniform planar light to the liquid-crystal panel 1 side.

The liquid-crystal panel 1 and light source device 4 are assembled together with the optical sheet 2 and frame body 3 as described below on the basis of the light guide plate 42, to configure the display apparatus 100.

The frame body 3 is placed on another wide surface of the light guide plate 42 on which no scattering dots 45 are formed. The frame body 3 is, for example, made of resin such as PET, PC (Poly Carbonate, preferably Poly Carbonate with Glass Fiber (PC+GF)) or ABS. It is desirable for the material of the frame body 3 to be a material having a thermal expansion coefficient equal to or closer to that of glass. This another wide surface of the light guide plate 42 has an outer shape substantially equal to or a little larger than that of the frame body 3. To both surfaces of the frame body 3, an adhesive such as double-sided tape, OCA (Optically Clear Adhesive) tape or UV curable resin for bonding the surfaces to glass is adhered. The frame body 3 is so placed that one circular surface thereof is in contact with the circumferential part of the above-described another wide surface of the light guide plate 42 and is bonded with the adhesive. It is to be noted that the frame body 3 itself may be a bonding material. Next, the optical sheet 2 is accommodated into the frame body 3 such that the diffusion sheet 23 is located at the side of the light guide plate 42 (as indicated by the arrow in FIG. 1). The optical sheet 2 has the shape of a rectangular film using PET as a base material, and is an optical sheet group including three sheets of, for example, a lens sheet 21, a prism sheet 22 and a diffusion sheet 23. The frame body 3 has an inner circumference a little larger than the optical sheet 2 to be accommodated therein, and has a thickness a little thicker than the optical sheet 2. The frame body 3 has predetermined spaces respectively in the plane and thickness directions when the optical sheet 2 is accommodated therein in consideration of the thermal expansion coefficient of the optical sheet 2. Next, the liquid-crystal panel 1 is placed. The liquid-crystal panel 1 is so placed on the frame body 3 that the circumferential part of the wide surface thereof at the glass substrate 12 side is in contact with the frame body 3. The glass substrate 12 and the frame body 3 may also be bonded together by an adhesive, or the frame body 3 itself may be made of a bonding material. This allows the optical sheet 2 to be sealed in the frame body 3, so that the liquid-crystal panel 1 and the light guide plate 42 are integrally formed. Here, it is possible to form the inner side of the frame body 3, i.e. the display surface, to be wider by making the outer circumference of the frame body 3 along the entire circumference of the outer peripheral edge of the glass substrate 11 of the liquid-crystal panel 1. Furthermore, the outer circumference of the frame body 3 substantially matches with the circumferences of the glass substrate and the light guide plate, so that the outer circumferences of the liquid-crystal panel 1, frame body 3 and light guide plate 42 form a continuous plane, thereby facilitating the respective positioning thereof. The reflection sheet 46 is then placed on a wide surface of the light guide plate 42 at the side where the scattering dots 45 are formed. The reflection sheet 46 may be adhered or bonded to the light guide plate 42. Moreover, the light emitting diode 41, substrate 43 and heat sink 44 are placed on an end surface at one long side of the light guide plate 42.

The display apparatus 100 is thus not provided with a holding member which has been used in the conventional display apparatus. The light guide plate 42 is made of glass, having a rigidity higher than that of a transparent plate made of resin such as PMMA or MS, and may be a basis for assembly of the main parts as described above. Therefore, a holding member (so-called backlight chassis) for holding the light guide plate 42 is not necessary. Moreover, the optical sheet 2 is sealed inside the frame body 3 between the light guide plate 42 and the glass substrate 12. The light guide plate 42 and glass substrate 12 are made of similar glass materials, and are similarly affected by thermal expansion or shrinkage. This makes it possible to integrally form the light guide plate 42 and the glass substrate 12 by bonding them through the frame body 3, thereby eliminating the need for a holding member for the optical sheet 2 having an outer shape larger than that of the liquid-crystal panel 1. Since the optical sheet 2 is housed inside the frame body 3 in the plane and thickness directions even when it is thermally expanded, wrinkles or deflections in the optical sheet 2 can be prevented from occurring.

Figure 3:
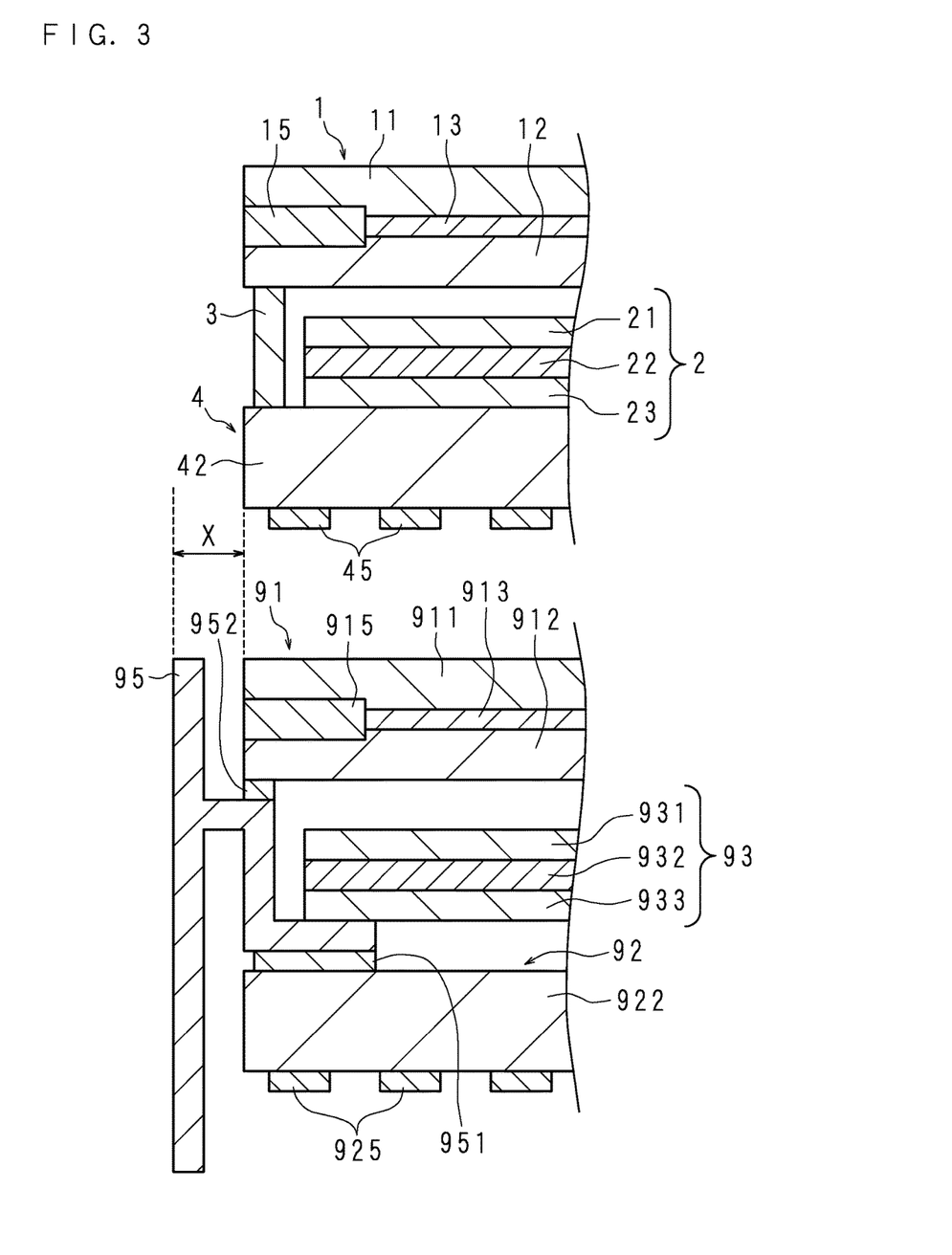
FIG. 3 shows a comparison between the display apparatus according to Embodiment 1 and a conventional display apparatus.
Figure 4:
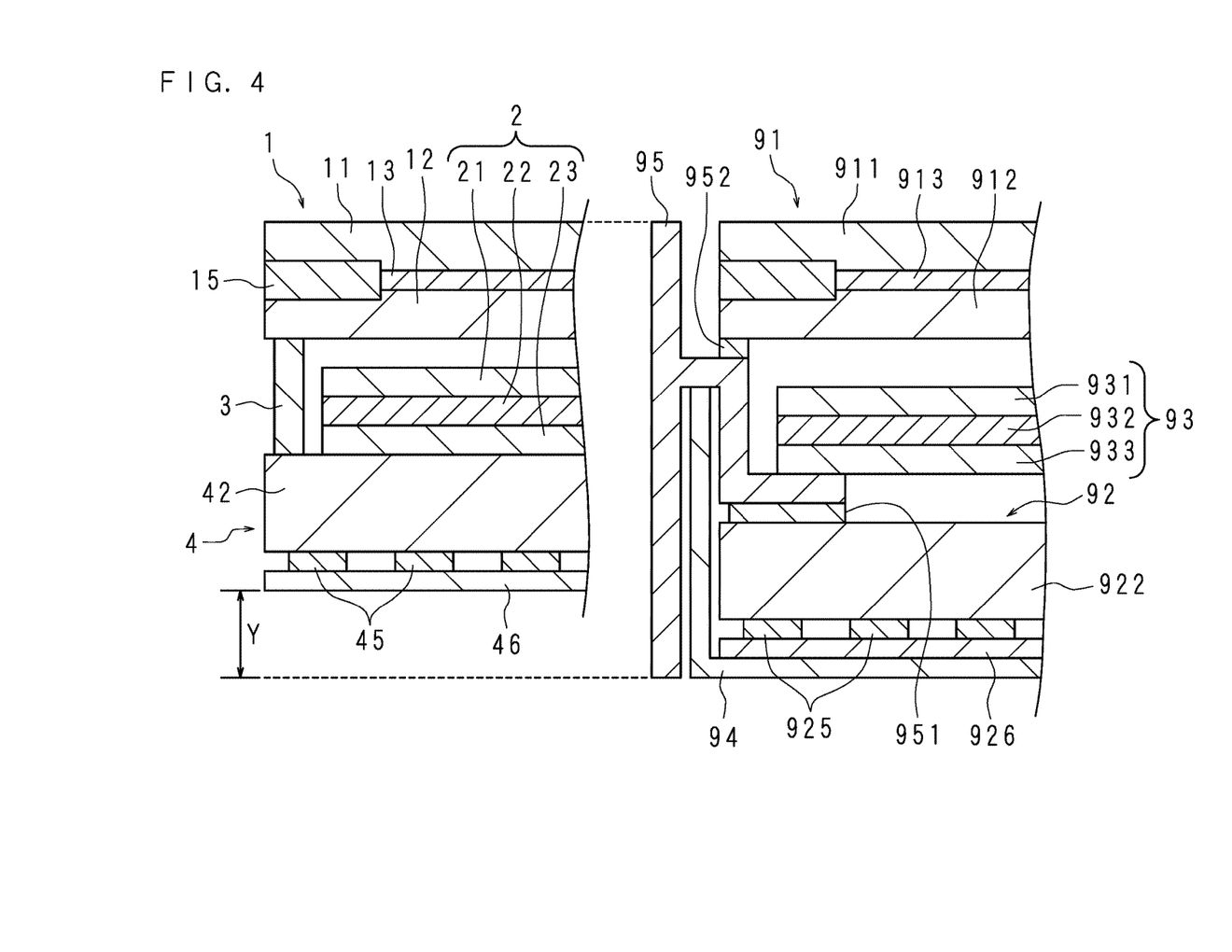
FIG. 4 shows a comparison between the display apparatus according to Embodiment 1 and a conventional display apparatus.

FIGS. 3 and 4 show comparison between the display apparatus 100 according to Embodiment 1 of the present invention and the conventional display apparatus 90. FIG. 3 shows the display apparatus 100 in Embodiment 1 at the top and the conventional display apparatus 90 at the bottom. FIG. 4 shows the display apparatus 100 in Embodiment 1 at the left and the conventional display apparatus 90 at the right. Note that either the display apparatus 100 or the display apparatus 90 shows a cross section of an end at one long side opposite to the side of the light-emitting diode 41 or 921.

As illustrated in FIG. 3, the size of the display apparatus 100 in Embodiment 1 can be reduced by the dimension indicated as X in FIG. 3 compared to that of the conventional display apparatus 90, enabling the conventional display apparatus 90 to realize narrowing of the border width. It is noted that the dimension X corresponds to the thickness of the side plate of the holding member 94 holding the light guide plate 922 in the conventional display apparatus 90, and the thickness of the circumferential plate of the rectangular flat plate of the holding member 95 fitted with the side plate to hold the liquid-crystal panel 91 and optical sheet 93.

As illustrated in FIG. 4, the display apparatus 100 according to Embodiment 1 can be thinner than the conventional display apparatus 90 by the dimension indicated as Y in FIG. 4, making it possible to realize reduction in thickness of the apparatus compared to the conventional display apparatus 90. It is to be noted that the dimension Y corresponds to the thickness of a bottom plate of the holding member 94 holding the light guide plate 922 in the conventional display apparatus 90 and the thickness of the rectangular flat plate of the holding member 95 holding the liquid-crystal panel 91 and the optical sheet 93.

Moreover, as illustrated in FIG. 4, the display apparatus 100 in Embodiment 1 is so configured that the liquid-crystal panel 1 is directly bonded to the frame body 3 and the light guide plate 42 is also directly bonded to the frame body 3. That is, it is different from the configuration of the conventional display apparatus 90, in which the liquid-crystal panel 91 is placed with respect to the holding member 95 through the spacer 952 while the holding member 95 is placed with respect to the light guide plate 92 through the spacer 951. Accordingly, the mutual distances among the liquid-crystal panel 1, optical sheet 2 and light guide plate 42 are shorter in the thickness direction compared to the conventional display apparatus 90. This increases the angle of the line connecting the peripheral part of the pixel region of the liquid-crystal panel 1 and the peripheral part of the light guide plate 42 with respect to the thickness direction, which makes the peripheral part of the optical sheet 2 and the light guide plate 42 hard to be seen, further enhancing the narrowing of the border width.

As described above, by adopting glass, which is the same material as that for the liquid-crystal panel 1 and is a transparent material with high rigidity, as a material for the light guide plate 42, reduction in the size and border width of the apparatus can be realized.

Embodiment 2

Figure 5:
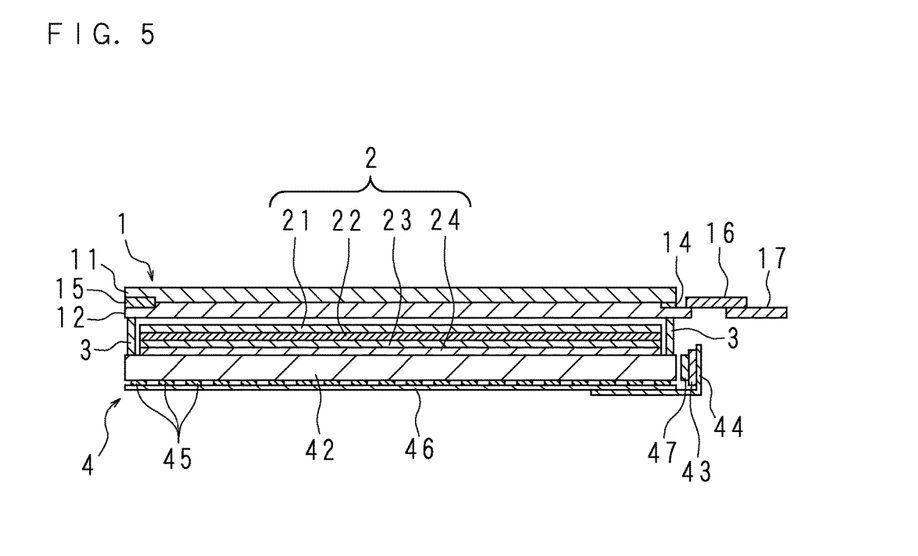
FIG. 5 is a cross section schematically illustrating the main parts of a display apparatus according to Embodiment 2.

FIG. 5 is a cross section schematically illustrating the main parts of the display apparatus 100 according to Embodiment 2. The configuration of the display apparatus 100 according to Embodiment 2 is similar to the configuration of the display apparatus 100 according to Embodiment 1, except for a part which will be described below. The common configuration parts are therefore denoted by the same reference numerals and will not be described in detail.

The optical sheet 2 according to Embodiment 2 includes, in addition to the lens sheet 21, prism sheet 22 and diffusion sheet 23, a fluorescent sheet 24 which is added with multiple types of fluorescent materials emitting fluorescent light of a wavelength on a side of a wavelength longer than that of blue, i.e. a wavelength in the range from green to red.

Furthermore, in the light source device 4 according to Embodiment 2, a blue light-emitting diode 47 which is not applied with a fluorescent material on its surface is used instead of the light-emitting diode 41.

The glass which is the material for the light guide plate 42 has such a property that the transmittance to light in the visible light region is not constant across all the different wavelengths. In particular, the transmittance of the light on the long wavelength side is lower than that on the short wavelength side. In Embodiment 2, blue light enters from an end surface on one long side of the light guide plate 42, and thus blue light with uniform luminance is emitted from a wide surface irrespective of the distance from the end surface. The blue light emitted from the light guide plate 42 enters one surface of the fluorescent material-added sheet 24, and a part thereof is output as it is while the rest thereof excites the fluorescent material which has been added thereto. Fluorescent light of different wavelengths from green to red is emitted inside the fluorescent material-added sheet 24. Thus, blue light, green light and red light are emitted from another surface of the fluorescent material-added sheet 24. It is therefore possible to irradiate the liquid-crystal panel 1 with uniform white planar light with high luminance also with the configuration in which the light guide plate 42 made of glass is used.

Another configuration may also be possible in which the light emitting surface of the light guide plate 42 is coated with a fluorescent material emitting fluorescent light on the side of a wavelength longer than that of blue, instead of the fluorescent material-added sheet 24. Moreover, not limited to the example described in Embodiment 2, the composition of the light guide plate 42 or the design of the scattering dots 45 formed on the light guide plate 42 may be modified to emit more uniform white planar light with higher luminance.

Embodiment 3

Figure 6:
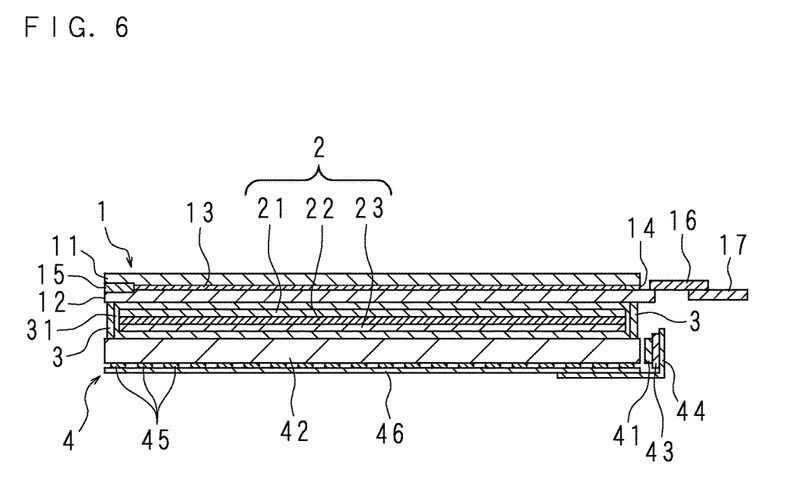
FIG. 6 is a cross section schematically illustrating the main parts of a display apparatus according to Embodiment 3.

FIG. 6 is a cross section schematically illustrating the main parts of the display apparatus 100 according to Embodiment 3. The configuration of the display apparatus 100 according to Embodiment 3 is similar to the configuration of the display apparatus 100 according to Embodiment 1, except for a part which will be described below. The common configuration parts are therefore denoted by the same reference numerals and will not be described in detail.

In the display apparatus 100 according to Embodiment 3, the frame body 3 in which the optical sheet 2 is sealed is filled with gel or liquid translucent material 31 having a refractive index lower than that of the optical sheet 2.

According to Embodiment 3, after the frame body 3 is placed on the light guide plate 42 at the time of assembly and the optical sheet 2 is accommodated therein, the translucent material 31 is filled into the frame body 3, and the liquid-crystal panel 1 is so placed as to cover the frame body 3.

Since many of the optical sheets constituting the optical sheet 2 use PET as base materials, not only expansion or shrinkage due to temperature change but also deflections due to absorption of moisture in the air may cause unevenness in display. According to Embodiment 3, the translucent material 31 is filled in the periphery of the optical sheet 2, preventing the optical sheet 2 from being in contact with moisture in the air, and thereby suppressing occurrence of deflections. Since the translucent material 31 has a refractive index lower than that of the optical sheet 2, the light emitted from the light guide plate 42 can travel into the optical sheet 2, making it possible to reduce the loss of light inside the frame body 3.

Embodiment 4

Figure 7:
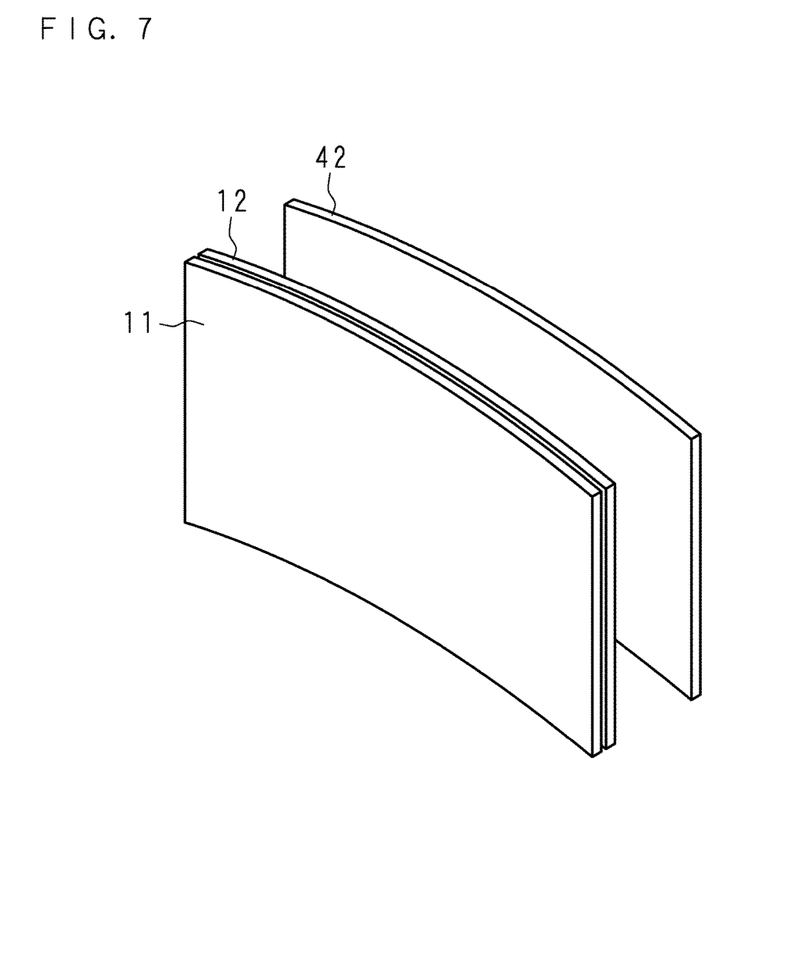
FIG. 7 is a perspective view schematically illustrating the liquid-crystal panel and the light guide plate in a display apparatus according to Embodiment 4.

FIG. 7 is a perspective view schematically illustrating the liquid-crystal panel 1 and the light guide plate 42 in the display apparatus 100 according to Embodiment 4. The display apparatus 100 according to Embodiment 4 is a curved display. According to Embodiment 4, the glass substrates 11 and 12 constituting the liquid-crystal panel 1 as well as the light guide plate 42 are formed in curved plates in advance, as illustrated in FIG. 7. Then, as in Embodiment 1, a curved display is formed by assembling main parts. Here, the frame body 3 is also placed to be along the glass substrate 12 and light guide plate 42 formed in curved plates.

Since glass has a rigidity higher than that of resin such as PMMA, a special holding member is not required for the curved light guide plate 42, thereby facilitating the manufacturing of a curved display compared to the case where a light guide plate made of resin is used.

The present embodiment disclosed in the above is illustrated in all aspects and are regarded as not being limitative. The scope of the present invention is defined not by the above descriptions of the embodiment but by the claims, which intend to include all the meanings equivalent to the claims and all the modifications within the scope.

The invention claimed is:

1. A display apparatus comprising:
   a liquid-crystal panel prepared by enclosing a liquid-crystal material between a pair of glass substrates opposing to each other and by sealing the liquid-crystal material with a seal material;
   a transparent plate opposed to the liquid-crystal panel, being a glass plate having a wide surface of corresponding shape to a front wide surface of the liquid-crystal panel;
   an optical sheet arranged between the liquid-crystal panel and the transparent plate, and being smaller than the liquid-crystal panel; and
   a frame body arranged between the liquid-crystal panel and the transparent plate, the frame body surrounding an outer periphery of the optical sheet with a predetermined air space between itself and the optical sheet, being adhered on a first position in a peripheral edge part of the wide surface of the transparent plate and on a second position in a peripheral edge part of a rear wide surface of the liquid-crystal panel, the first and the second positions corresponding to a position in an area where the seal material is arranged, and being thicker than the optical sheet,
   wherein the frame body is made of a bonding material for bonding the liquid-crystal panel and the transparent plate, and
   wherein holding members for holding the transparent plate and the optical sheet are absent.

2. The display apparatus according to claim 1, wherein each of the glass substrates has a rectangular shape.

3. The display apparatus according to claim 1, wherein
   the frame body is formed along a whole circumference of an outer periphery of the transparent plate or each of the glass substrates.

4. The display apparatus according to claim 1, wherein
   the frame body has an outer periphery substantially equal to an outer periphery of the transparent plate or each of the glass substrates.

5. The display apparatus according to claim 1, further comprising
   a blue light emitting diode arranged to be opposed to a part of a peripheral surface of the transparent plate, or to a surface of the transparent plate opposite to the liquid-crystal panel,
   wherein
   the optical sheet is composed of a plurality of optical sheets including, on a side of the transparent plate, a sheet added with a fluorescent material emitting fluorescent light having a wavelength longer than a wavelength of the blue light.

6. The display apparatus according to claim 1, further comprising
   a blue light emitting diode arranged to be opposed to a part of a peripheral surface of the transparent plate, or to a surface of the transparent plate opposite to the liquid-crystal panel,
   wherein
   a fluorescent material emitting fluorescent light having a wavelength longer than a wavelength of the blue light is applied to the wide surface of the transparent panel on a side of the liquid-crystal panel.

7. The display apparatus according to claim 1, wherein
   gel-like or liquid-like translucent material having a refractive index lower than a refractive index of the optical sheet, is filled in an inner space of the frame body.

8. The display apparatus according to claim 1, wherein
   the liquid-crystal panel and the transparent panel are curved plates.

9. The display apparatus according to claim 1, wherein the frame body comprises a polycarbonate.

10. The display apparatus according to claim 9, wherein the polycarbonate frame body is formed along a whole circumference of an outer periphery of the transparent plate or each of the glass substrates.

* * * * *